United States Patent [19]

Roney

[11] 4,002,990
[45] Jan. 11, 1977

[54] ELECTRONIC PULSE FILTERING SYSTEM
[76] Inventor: Ellis L. Roney, 171 Jardin Drive, Los Altos, Calif. 94022
[22] Filed: July 22, 1957
[21] Appl. No.: 673,472
[52] U.S. Cl. .............................. 328/138; 328/140; 328/109; 307/218
[51] Int. Cl.² ...................... H03K 9/06; H03D 3/02
[58] Field of Search ......... 250/27 O, 27 W, 27 PD, 250/27 CC, 27 GT, 27 TR, 27 PS; 328/108, 109, 138, 140; 307/218

[56] References Cited
UNITED STATES PATENTS

| | | | |
|---|---|---|---|
| 2,444,426 | 7/1948 | Busignies | 328/58 X |
| 2,493,648 | 1/1950 | Watton et al. | 328/115 X |
| 2,533,552 | 12/1950 | Brinster et al. | 328/139 X |
| 2,538,027 | 1/1951 | Mozley et al. | 328/91 X |
| 2,545,567 | 3/1951 | Bridges | 328/158 X |
| 2,554,112 | 5/1951 | Libois | 307/108 |
| 2,577,827 | 12/1951 | Tompkins | 328/112 X |
| 2,689,299 | 9/1954 | Anderson | 328/108 |
| 2,776,424 | 1/1957 | Lair et al. | 343/7.3 |
| 2,789,267 | 4/1957 | Beal et al. | 328/93 X |
| 2,795,775 | 6/1957 | Faymoreau et al. | 328/65 X |

Primary Examiner—John S. Heyman

[57] ABSTRACT

An analyzing circuit is disclosed in which a train of pulses is applied in parallel to a normally closed gate and to a control circuit for opening and closing the gate. The control circuit includes a pair of single-shot multivibrators alternately driven by a bistable circuit and having adjustable pulse widths so that at a predetermined input frequency, the output pulse widths thereof will overlap when combined. The overlapped portions when combined then control by opening the gate to allow pulses above the predetermined frequency to pass through the analyzing circuit.

3 Claims, 7 Drawing Figures

*INVENTOR.*
ELLIS L. RONEY
BY
ATTORNEY.

ELECTRONIC PULSE FILTERING SYSTEM

This invention relates to apparatus for receiving and analyzing intelligence conveyed by trains of pulses, and more particularly to a selective filtering system therefor.

In pulse communication systems, which may include either radar or intelligence communication where the pulses are time modulated for transmission of intelligence, pulses of similar characteristics can be used to interfere with or jam such systems. To effectively jam the system of an enemy, for example, it is necessary first to analyze the intelligence conveyed by the enemy's pulse transmission in order to determine the nature of the pulses which must be transmitted to cause interference. The pulses may be analyzed with respect to amplitude, pulse width, or the shape of the leading and trailing edges, and a very important characteristic on which information is desirable to institute a jamming program, is the pulse repetition rate. In some situations it is desirable to determine the pulse repetition frequency of pulses only above, or only below, a predetermined frequency, and to facilitate this analysis it is convenient to eliminate from the analyzing circuitry, all pulses having a repetition frequency below, or above, the predetermined frequency, respectively.

It is therefore an object of the present invention to provide a selective pulse filtering system for eliminating from a train of pulses those pulses having a pulse repetition frequency falling in a given frequency range.

Another object of the invention is to provide an electronic pulse filtering system of the character indicated capable of reliable filtering operation in spite of wide variations in amplitude and pulse shape of the pulses under analysis.

Assuming, for example, that in an area under surveillance, an enemy is transmitting pulse intelligence with a variety of pulse repetition rates, but from otherwise available information it has been decided to analyze only those pulses having a pulse repetition frequency above a predetermined frequency, a pulse filtering system in accordance with the invention is capable of selecting only those pulses above the given frequency and to eliminate those pulses having a lower repetition frequency regardless of the amplitude and the shape of the pulses. In one embodiment of the invention, the train of pulses is applied in parallel to a normally closed gate circuit and to a control circuit for opening and closing the gate. The control circuit preferably includes a bi-stable circuit, such as a flip-flop circuit, the two pulse outputs of which are differentiated and respectively applied to a pair of single-shot multivibrators which are adjusted to provide output pulses having periods approximately equal to the pulse repetition period at the predetermined frequency. The pulses from the single-shot multivibrators are added in a voltage peak reader, the output of which is applied as a control signal to the normally closed gate. The output pulses of the single-shot multivibrators are so phased that so long as their pulse repetition frequency is below the given frequency their sum does not produce a signal of sufficient amplitude to open the gate. However, when the repetition frequency exceeds the given frequency, the output pulses from the single-shot multivibrators overlap, and upon addition, produce voltage spikes which exceed the normal amplitude of the pulses from the multivibrators and produce an abrupt and continuing increase in the output of the voltage peak reader. The latter signal is of sufficient magnitude to open the gate, for example a biased-off pentode, to allow pulses in excess of the given frequency to pass through to the analyzing circuitry.

In other situations, it may be desirable to analyze only those pulses having a repetition rate below a selected frequency, in which case the gating circuit of the present system may be biased to be normally open for pulse repetition rates below the selected frequency and to be closed when the pulse rate exceeds the selected frequency. To this end, the output of the described voltage peak reader may be inverted prior to application to the normally open gating circuit to close the gate for pulses having a rate in excess of the selected frequency, thereby to provide, in effect, a low-pass filter.

To provide either a band-pass or a band-rejection filter, the high-pass filter may be connected in tandem with a lowpass filter, each filter possessing suitable cut-off frequencies to define the limits of the band.

The nature of the invention, its application, and further objects and features of novelty will be better appreciated from the following detailed description of a preferred embodiment when considered with the accompanying drawing in which.

Figure 1:
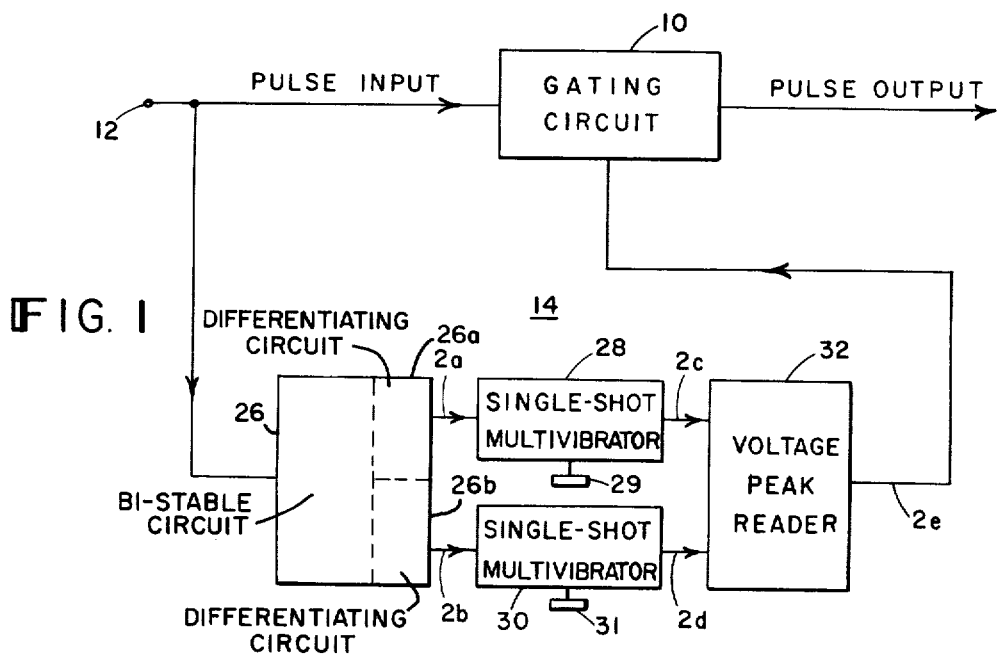
FIG. 1 is a block diagram of the invention.

Referring to FIG. 1, the filtering system therein shown consists of a gating circuit 10 that controls which of the input pulses applied to input terminal 12 are passed and a control channel 14 for controlling the opening or closing of the gating circuit. Gate circuit 10 may be any of many forms known to the art, for example, in the case of a high-pass filter, a pentode tube biased off and arranged to be rendered conducting upon application to its screen grid of a direct current signal of sufficient amplitude to overcome the bias, or in the case of a low-pass filter, a normally conducting pentode arranged to be cut off by a negative direct current signal.

Figure 2:
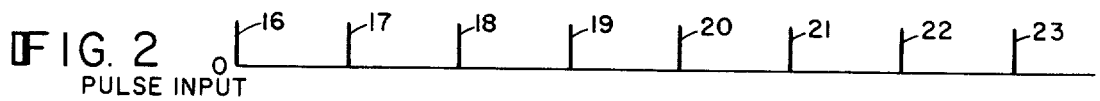
FIGS. 2 through 2E are waveforms useful in the explanation of the filtering operation of the system of FIG. 1.

Referring also to FIG. 2, and assuming that a train of pulses 16-23 is applied in parallel to the gating circuit 10 and to the control circuit 14, the operation of the system as a high-pass filter will now be described. As shown, the input pulses are of uniform spacing and as will be seen later, have a pulse repetition frequency slightly in excess of the frequency at which it is intended filtering should occur. Assuming further that the gating circuit 10 is initially closed, the input pulses are not passed by the gating circuit.

Figure 2A:
Figure 2B:

A principal feature of the control channel is a bi-stable circuit 26, preferably a flip-flop circuit adjusted to be triggered from one state of conduction to the other by each input pulse applied thereto. The circuit 26 may take a variety of forms; e.g., a multivibrator of the Eccles-Jordan type, employing electron tubes or transistors, or it may be a magnetic flip-flop. Assuming, by way of example, that the bi-stable circuit 26 is a multivibrator employing electron tubes, a positive pulse appears on the plate of each tube on every second input pulse; i.e., pulses of half the repetition frequency of the input pulses appear at each of the plates of the tubes of the flip-flop. These pulses are differentiated by any suitable differentiating circuit available to the art, shown diagrammatically at 26a and 26b, to produce at terminals 2a and 2b two trains of pulses respectively shown in FIGS. 2A and 2B. As illustrated, an output pulse appears at terminal 2a for every second input pulse; i.e., in response to and occurring in time-coincidence with input pulses 16, 18, 20, etc., and an output pulse appears at terminal 2b for each of the alternate input pulses; i.e., in response to and in time-coincidence with pulses 17, 19, 21, etc.

Figure 2C:
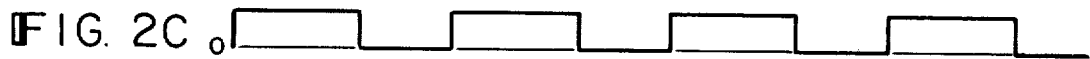
Figure 2D:

The output pulses at 2a are applied to a single-shot multivibrator 28 to switch the same from the "off" to the "on" condition, and the output pulses at 2b similarly switch a second single-shot multivibrator 30 from the off to the on condition. Multivibrators 28 and 30 are of the type that upon triggering produce a rectangular output pulse of a duration determined by the parameters of the circuit and then switch back to the off condition. The on period of multivibrators of this type is normally adjustable, for example, by adjustment of the bias on one of the tubes, as by control knobs indicated at 29 and 31, and in the present case, the on periods are adjusted to be approximately equal to the pulse repetition period at the frequency where filtering action is desired. As shown in FIGS. 2C and 2D, the on period of the multivibrators is slightly longer than the period between pulses 16 and 17, between pulses 17 and 18, etc.

Figure 2E:
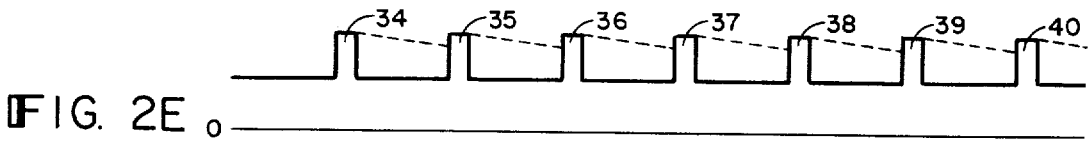

The output pulses from multivibrators 28 and 30 are added in a voltage peak reader 32 and the sum integrated to produce a DC signal. It will be seen that if the on period of the single-shot multivibrators is exactly equal to the period between input pulses the sum of the waves of FIGS. 2C and 2D will be zero and no direct current signal will result. However, if the repetition frequency of the input pulses increases slightly beyond the threshold frequency (determined by the period of multivibrators 28 and 30) the output pulses of FIGS. 2C and 2D will begin to overlap, as shown in FIG. 2E, and produce voltage spikes 34–40 above the normal amplitude of the pulses from the multivibrators. These spikes are integrated in circuit 32 and produce an increase in the output voltage, a steady direct current signal, which is applied to gating circuit 10. The parameters of circuit 10 are so chosen that when such overlap occurs, the control signal applied to the gate is of sufficient amplitude to open the gate and allow the input pulses to pass therethrough. Thus, it is seen that only pulses above the threshold frequency are allowed to pass the gating circuit. If more attenuation is required than that afforded by a single gating circuit, further gates controlled by the signal from circuit 32 may be added in tandem with circuit 10.

While the invention has been illustrated as applied to a high-pass pulse filter, with minor changes it may be converted to either a low-pass filter or a band-pass filter. For the low-pass application, the input pulses 16–23 are applied in parallel to the gating circuit 10 and the control circuit 14 as before, but instead of being normally closed as in the high-pass case, gating circuit 10 is normally open. That is, gate circuit 10 may be a pentode as before, but biased so as to be normally conducting and to be cut off upon application of a negative signal of suitable magnitude. Control circuit 14 is operable as described above to produce a direct current output signal when the selected pulse frequency approaches the selected cut-off frequency, which as before is determined by the periods of multivibrators 28 and 30. Before application to gating circuit 10, however, the output of voltage peak reader 32 is inverted, the parameters of circuits 32 and 10 being so chosen that when overlap of the output pulses of multivibrators 28 and 30 occurs, the direct current signal is of sufficient amplitude to close the gate and prevent the passage of pulses therethrough. Thus, only pulses below the selected cut-off frequency are allowed to pass the gating circuit.

From the foregoing description of the invention as applied in a high-pass, and a low-pass, pulse filtering system, it will be apparent that by connection of the low-pass filter in tandem with a high-pass filter, and with suitable selection of cut-off frequencies, either a band-pass or a band-rejection filter may be readily provided.

From the foregoing it will be seen that the control channel is not sensitive to variations in pulse shape or duration of the input pulses, the only requirement being that they be of sufficient amplitude to trigger the alternator 26. In a system constructed in accordance with the invention and satisfactorily operated, the input pulses were of approximately 10 volts amplitude and 3 microseconds duration.

While the invention has been shown and described in connection with a specific embodiment, it is recognized that various changes and modifications may be made therein without departing from the invention. It will be understood, therefore, that this embodiment is shown by way of example only and not as limiting the objects of the invention and the appended claims.

What is claimed is:

1. A pulse filtering system adapted to pass to an output circuit only those pulses of a train of substantially uniformly spaced input pulses whose repetition frequency exceeds a predetermined frequency, said system comprising, a normally closed gating circuit, a bi-stable circuit having first and second output terminals operative in response to a train of input pulses to produce outward pulses alternately at said first and second output terminals, means for applying a train of input pulses in parallel to said gating circuit and to said bi-stable circuit, first and second single-shot multivibrators arranged to be switched by the pulses from the first and second output terminal respectively of said bi-stable circuit, said single-shot multivibrators each being operative to produce trains of rectangular output pulses of substantially equal durations equal to the repetition period at said predetermined pulse repetition frequency, means for adding the pulses from said first and second single-shot multivibrators and operative to produce a direct current signal only when the pulse repetition frequency of said input pulses exceeds said predetermined frequency, and means for coupling said direct current signal to said gating circuit to open the same and allow the transmission of said input pulses therethrough.

2. A pulse filtering circuit adapted to pass to an output circuit only those pulses of a train of substantially uniformly spaced input pulses whose frequency differs from a predetermined repetition frequency, said circuit comprising, a gating circuit, a control circuit having input and output terminals, and means for applying said train of input pulses to said gating circuit and to the input terminal of said control circuit in parallel, said control circuit including means operative in response to said input pulses to generate two like trains of rectangular pulses each of a repetition frequency equal to one-half that of the repetition frequency of said input pulses and displaced relative to each other by the period of said input pulses, the duration of the rectangular pulses in each train being equal to the repetition period at said predetermined repetition frequency, means for adding the pulses in said two like trains and operative to produce a direct current control signal at said output terminal only when the period of said input pulses is shorter than the duration of said rectangular pulses, and means for coupling said control signal from said output terminal to said gating circuit.

3. A pulse filteriing circuit adapted to pass to an output circuit only those pulses of a train of substantially uniformly spaced input pulses whose repetition frequency is below a predetermined repetition frequency, said circuit comprising, in combination, a normally open gating circuit biased to be closed upon application thereof of a control signal in excess of a predetermined magnitude, a control circuit having input and output terminals, means for applying said train of input pulses in parallel to said gating circuit and to the input terminal of said control circuit, said control circuit including means operative in response to said input pulses to generate two trains of rectangular pulses each having a repetition frequency equal to one-half the repetition frequency of said input pulses and displaced relative to each other by the spacing between said input pulses, the duration of the rectangular pulses in each train being equal to the repetition period at said predetermined repetition frequency, means for adding the pulses in said two trains of rectangular pulses and operative to produce at said output terminal a direct current control signal in excess of said predetermined magnitude only when the repetition period of said input pulses is shorter than the duration of said rectangular pulses, and means for coupling said control signal to said gating circuit to close said gating circuit, whereby only those pulses having a repetition frequency less than said predetermined frequency are passed to an output circuit.

* * * * *